Aug. 27, 1957 G. GAVITO 2,804,159
DOOR LOCK SAFETY SYSTEM FOR MOTOR VEHICLES
Filed June 15, 1955
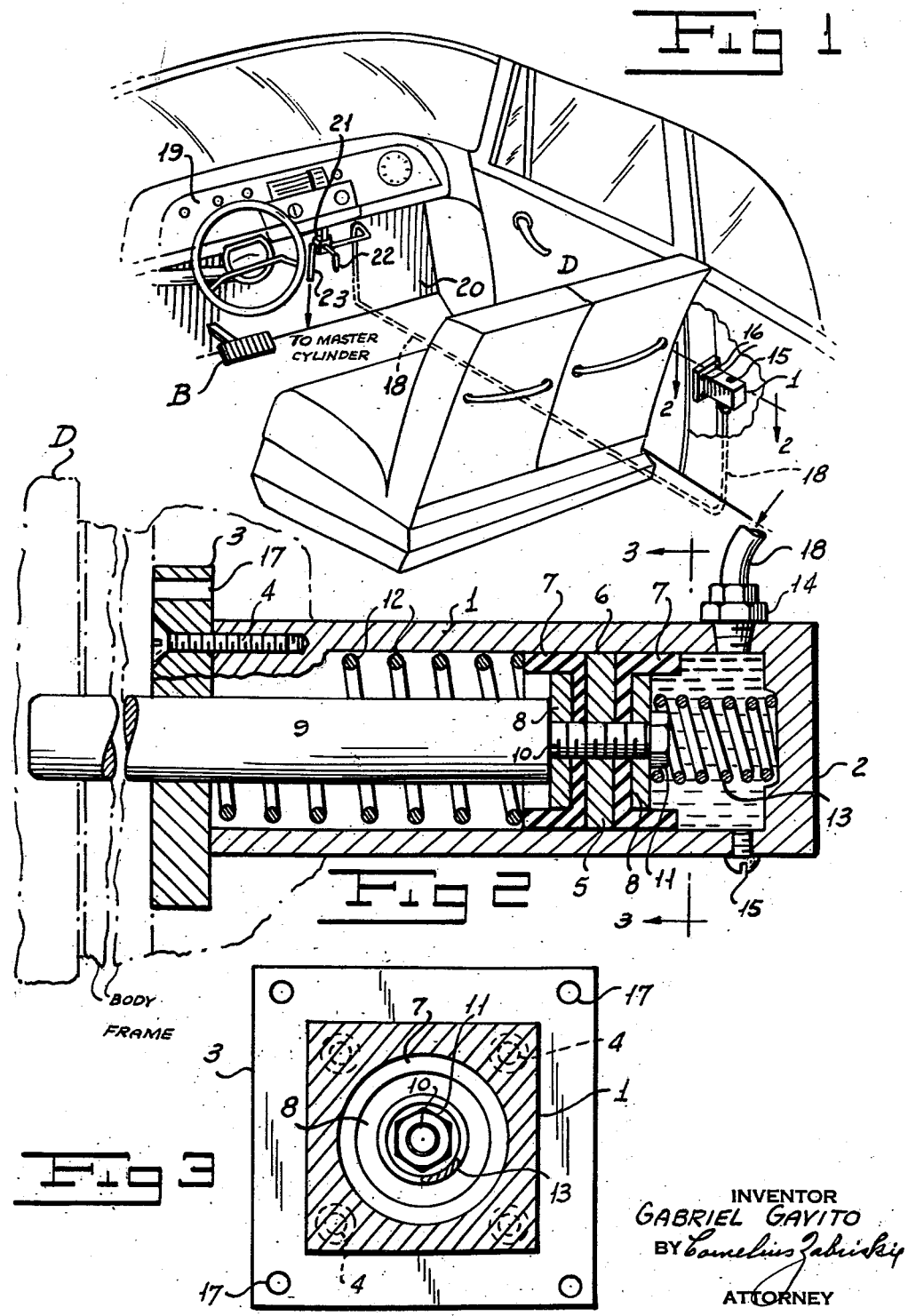
INVENTOR
GABRIEL GAVITO
BY Cornelius Zabriskie
ATTORNEY

2,804,159
DOOR LOCK SAFETY SYSTEM FOR MOTOR VEHICLES

Gabriel Gavito, New York, N. Y.

Application June 15, 1955, Serial No. 515,695

3 Claims. (Cl. 180—82)

This invention is a safety system for motor vehicles according to which the doors of the vehicle are provided with individual supplementary locks all of which are controlled from a common point of easy access to the driver of the vehicle, whereby the doors of the vehicle may be locked in closed position so that passengers, and more particularly children, cannot open them when the vehicle is in motion and unless or until the said doors are unlocked by the driver.

The object of the invention is to provide a relatively simple system for controlling the several doors of the vehicle and which may be readily made a part of any vehicle, particularly passenger cars, without damaging the car or detrimentally affecting its resale value.

In accordance with this invention, the supplementary locks of the several doors are of the hydraulic pressure operated type and are connected through appropriate piping to the hydraulic braking system of the vehicle so that the brake fluid may be utilized to operate said locks. The doors are adapted to be locked by operation of the locks through pressure upon the brake pedal of the vehicle and when locked, the locks are adapted to be maintained in locked condition by trapping the part of the brake fluid within the locks. When the trapped brake fluid is released to return to the brake system, the doors are unlocked and may be opened.

Features of the invention, other than those adverted to, will be apparent from the hereinafter detailed description and appended claims, when read in conjunction with the accompanying drawing.

The accompanying drawing illustrates one practical embodiment of the invention, but the construction therein shown is to be understood as illustrative, only, and not as defining the limits of the invention.

Fig. 1 is a fragmental perspective looking into the interior portion of a passenger car equipped according to this invention.

Fig. 2 is a section on the line 2—2 of Fig. 1.

Fig. 3 is a section on the line 3—3 of Fig. 2.

In the accompanying drawing, 1 indicates a hydraulic cylinder one end of which is closed by an integral end wall 2, while the other end is closed by an attaching plate 3 secured to the cylinder by screws 4. Operable within the cylinder is a piston 5. This piston may be of any desired structure but, as shown, it embodies a center disk 6 at the opposite sides of which are rubber or leather packing cups 7 in which are fitted washers 8.

Operable through a central opening in the attaching plate 3 is a bolt 9, the inner end of which has a reduced threaded shank 10. This shank extends through perforations in the several parts of the piston and receives the nut 11 by which the piston parts may be firmly clamped to one another and to the piston. A relatively strong spring 12, interposed between the piston and the attaching flange, normally serves to retract the piston and a relatively light spring 13 serves to cushion the piston on its retractive stroke and limits such movement so as to leave at all times a fluid inlet chamber back of the piston. Fluid under pressure is adapted to be introduced into this chamber through a fitting 14 while a screw 15 normally closes a tapped opening through which air may be bled from the system, when the screw is loosened.

One of the hydraulic locks, shown in Fig. 2, is adapted to be associated with each of the vehicle doors, although the door of the driver's seat is generally not so equipped. The lock for any particular door may be mounted to cooperate with any of the unhinged edges of the door, i. e., with either the top or bottom of the door or with the free vertical edge. In Fig. 1 of the drawings, the equipment is shown appropriate to a two door coupe having doors provided with the usual conventional locks. In such an installation it is convenient to mount the supplementary lock of this invention as shown in this figure. This may be accomplished by removing the inner panel of the body aft of the door and by drilling a hole of slightly larger diameter than the bolt 9 horizontally through the body frame and also into or through the frame of the door D. This having been accomplished, the supplementary lock, cylinder 1 and attaching plate 3 are brought into the position shown in Fig. 1 and secured in place by screws 16 passed through perforations 17 in the attaching plate 3 as shown.

Having mounted the supplementary lock as described, the fluid inlet fitting 14 is next connected to a pipe 18 which is led to any desired control position, preferably located on the instrument board 19 or immediately below the same on the dash 20. Here the pipe is connected to a control valve 21 having a manually operable handle 22. The valve may be mounted on a bracket or in any other appropriate manner so as to be rigid. Next a pipe 23 is led from the valve 21 to any convenient and appropriate portion of the hydraulic brake system of the vehicle. I prefer to connect the pipe 23 directly to the master brake cylinder for such connection may be conveniently made. When this has been accomplished the installation is complete.

The locking of the door D by the supplementary lock may be accomplished by simply turning the handle 22 into position to establish open communication between the braking system and the hydraulic cylinder 1 and then pressing down on the foot brake B of the vehicle. When the brake is depressed, fluid from the brake system is forced into the safety system of this invention and acts against the piston 5 to force the bolt 9 into the hole drilled into the door D and thus effect the locking of the door. After the bolt has been moved into locking position and before releasing the brake pedal B, the valve 21 should be closed so as to trap the brake fluid in the safety system and thus hold the piston in its forward door locking position. So long as this valve is closed, the door will remain locked. The unlocking of the door is accomplished by simply opening the valve 21 while the brake lever is unpressed. This will permit the brake fluid to flow back to the master cylinder of the brake system and such flow will be impelled by the bolt retracting spring 12 so that the bolt will be withdrawn from the door and the door may be opened.

The purpose of the bleed screw 15 is to permit all air to be evacuated from the system, when the system is initially installed, so that the system may be operated hydraulically in a positive and effective manner.

In the accompanying drawing I have shown the supplementary lock as associated with one door of the vehicle. Such locks may be associated with as many doors of the vehicle as desired by simply connecting to the housing valve 21 as many pipes 18 as there are doors and equipping each door in the car with its own individual supplementary lock. When the car is equipped in the manner specified, children in the car cannot open the doors and fall out, as so frequently occurs in cars wherein the opening of any door by a passenger is possible and easy to do.

This invention was primarily conceived for the protection of children in a car. However, it may be utilized to protect passengers of all ages and will also preclude the occupants of the car from opening the doors from without. Furthermore the invention may be employed to advantage in taxis, school buses, and other passenger vehicles and even on trucks should it be so desired.

By operating the several locks hydraulically I provide an absolutely positive system of door locking and one which may be effectively controlled at all times. Such a hydraulic system has marked advantages over any electrical system intended for the same general purpose. My experience has shown that electrical systems cannot be depended upon because they tend to fail through battery failure, short circuiting, burned out coils, etc.

The foregoing detailed description sets forth the invention in its preferred practical forms, but the invention is to be understood as fully commensurate with the appended claims.

Having thus fully described the invention, what I claim as new and desire to secure by Letters Patent is:

1. In a motor vehicle comprising a body having a door provided with a lock, and a hydraulic brake system comprising means for actuating the brake system to brake the vehicle: the improvement which comprises a supplementary hydraulically operable lock mounted on the body and having a bolt protrusible into locking engagement with the door, means for normally retracting said bolt, piping connections leading from the supplementary lock to the hydraulic brake system of the vehicle whereby the hydraulic setting of the brakes of the vehicle will also hydraulically lock the door, and a valve included in said piping connections adapted when in unsealed condition to pass fluid from the hydraulic brake system through said piping connections to the supplementary lock and when in sealing condition to trap the hydraulic fluid in the supplementary lock to maintain the door in locked position.

2. A motor vehicle according to claim 1, wherein the supplementary lock comprises a cylinder, a piston in said cylinder, a door locking bolt attached to the piston, a spring for normally retracting the piston to withdraw the bolt from the door, and a fitting for attaching the piping connections to the cylinder back of the piston.

3. A motor vehicle according to claim 1, wherein the brake system comprises a master cylinder and wherein the piping connections with the supplementary lock are connected to said master cylinder.

References Cited in the file of this patent

UNITED STATES PATENTS

| | | |
|---|---|---|
| 1,154,439 | Scholfield et al. | Sept. 21, 1915 |
| 2,167,675 | Palmer | Aug. 1, 1939 |
| 2,185,909 | Caponey | Jan. 2, 1940 |
| 2,344,826 | LeGresley | Mar. 21, 1944 |